(12) United States Patent
Raje et al.

(10) Patent No.: US 8,414,673 B2
(45) Date of Patent: Apr. 9, 2013

(54) SYSTEM FOR INLET AIR MASS ENHANCEMENT

(75) Inventors: Atul Raje, Mumbai (IN); Anand Singh, Gurgaon (IN)

(73) Assignee: Freudenberg Filtration Technologies India Pvt. Ltd., Mumbai (IN)

( * ) Notice: Subject to any disclaimer, the term of this patent is extended or adjusted under 35 U.S.C. 154(b) by 0 days.

(21) Appl. No.: 12/519,223

(22) PCT Filed: Dec. 13, 2007

(86) PCT No.: PCT/IN2007/000589
§ 371 (c)(1),
(2), (4) Date: Mar. 3, 2010

(87) PCT Pub. No.: WO2008/072260
PCT Pub. Date: Jun. 19, 2008

(65) Prior Publication Data
US 2010/0175558 A1    Jul. 15, 2010

(30) Foreign Application Priority Data
Dec. 15, 2006  (IN) .......................... 2058/MUM/2006

(51) Int. Cl.
*B01D 46/00* (2006.01)

(52) U.S. Cl. .......... 55/410; 55/385.1; 55/473; 55/482.1; 55/486; 55/505; 95/8; 95/10; 95/14; 96/189

(58) Field of Classification Search ................. 55/385.1, 55/473, 482.1, 486, 505, DIG. 37; 96/189; 95/8, 10, 14
See application file for complete search history.

(56) References Cited

U.S. PATENT DOCUMENTS

| | | | |
|---|---|---|---|
| 4,848,988 A | 7/1989 | Suzuki | |
| 5,531,801 A * | 7/1996 | Sewell et al. | 96/240 |
| 5,537,813 A * | 7/1996 | Davis et al. | 60/775 |
| 5,678,526 A | 10/1997 | Cullen | |
| 5,918,458 A | 7/1999 | Coffinberry | |
| 6,935,251 B2 | 8/2005 | Marin | |
| 7,237,386 B2 | 7/2007 | Hoffmann | |
| 7,306,650 B2 * | 12/2007 | Slayzak et al. | 95/91 |
| 2006/0225696 A1 | 10/2006 | Moktader | |
| 2008/0010959 A1 * | 1/2008 | Gillingham et al. | 55/486 |
| 2008/0087587 A1 * | 4/2008 | Burrows | 210/86 |
| 2009/0123700 A1 * | 5/2009 | Conley et al. | 428/152 |

FOREIGN PATENT DOCUMENTS
JP    63214316    9/1988

* cited by examiner

*Primary Examiner* — Jason M Greene
*Assistant Examiner* — Karla Hawkins
(74) *Attorney, Agent, or Firm* — Lucas & Mercanti, LLP

(57) ABSTRACT

A system and apparatus for enhancement of inlet air mass for processes by progressive filtration and intermediate cooling.

13 Claims, 4 Drawing Sheets

SYSTEM FOR INLET AIR MASS ENHANCEMENT

FIELD OF INVENTION

This invention relates to a system for inlet air mass enhancement.

In particular, this invention relates to a system and apparatus for enhancement of inlet air mass in a turbo-machinery for air consuming processes.

BACKGROUND OF THE INVENTION

Improving the efficiency of any air consuming process like combustion, air separation, air compression for obtaining mechanical power is of considerable importance as this leads to saving of the fuel used for these processes. Most of the common fuels consumed are non replenish-able hydrocarbons. Inefficient burning of these fuels results in extensive pollution and is one of the main causes of global warming. If the air to fuel ratio is correctly maintained then the fuel is fully burned and causes little or no pollution to the atmosphere. Reducing the amount of fuel is one of the ways of improving the combustion process but leads to severe drop in power produced and is not feasible beyond certain levels. Improving the quality and amount of air available for combustion process is a better option.

Air required for any combustion process needs to be free of dust particles as the presence of dust particles cause damage to fuel injection nozzles, cooling slits in the combustion chamber and other parts of the fuel metering system. Therefore air is filtered by introducing a proper filtration system in the inlet air duct. Introduction of a filtration system in the inlet duct causes pressure drop and causes reduction of air mass passing through the filter. Over a period of use, the filters tend to get choked with entrapped dust particles causing further pressure drop across the filter and proportionate reduction in the inlet air mass due to reduction of inlet air pressure.

Compressing the inlet air is one of the methods of improving the mass of air available for the combustion process. A reciprocating or rotary compressor is used after pre-filtration to compress the air to increase the air density and thereby improve the air mass available for combustion. Compressing the inlet air increases the air temperature above the ambient. In temperate regions where the ambient temperatures are low, the increase in inlet air temperature due to compression is of no significance. Whereas in tropical and arid conditions the ambient temperature of the air is in the range of 15° to 30° Celcius, further rise in air temperature due to the compression process reduces the overall efficiency of the combustion process.

The efficiency of a gas turbine, or more correctly the overall thermal efficiency, is the ratio of mechanical work done to the heat supplied. The Carnot efficiency is defined as:

$$\eta_{carnot} = W/Q = (T_{max} - T_{min})/T_{max}$$

Where:
W=mechanical work heat supplied Q=heat supplied $T_{max}$=maximum temperature $T_{min}$=minimum temperature With the Carnot formula, efficiency can be expressed as temperatures. For gas turbines, $T_{max}$ is the temperature of the hot gases leaving the combustion chamber gases and $T_{min}$ is the ambient temperature.

If it is assumed that fuel is burnt at stoichiometric conditions to obtain a flame temperature of 2500 K and a turbine is designed to withstand 2500 K, then the engine is working at a pressure ratio of 100, which is very high but not unreasonable assuming that the internal losses are negligible.

Based on above, such a hypothetical gas turbine results in an efficiency of approximately 65%.

However, in comparison, the best-performing, simple, open-cycle, single-shaft machines show an efficiency of approximately 40%.

From the Carnot efficiency formula above, it is found that efficiency can be increased by increasing the temperature span between the heat source and heat sink. The heat sink cannot be made to go to a lower temperature, according to the second law, but the heat-source temperature can be increased, for example by firing more, fuel. Firing more fuel raises the temperature and increases the temperature span.

The difficulty in increasing the firing temperature is to find durable materials for use in combustor linings and turbine blades. When new materials become difficult to find, then other ways have to be found to get around the problem of overheating. Another method is to enhance the mass of air being fed to the air consuming process.

Theory that forms the basis of this invention is based on the fact that gas turbines ingest a constant volume of air regardless of the ambient air temperature. The gas turbine's power output increases as air mass flow rate increases provided other variables are kept constant. With the constant volumetric flow of a gas turbine, by increasing the air compressor inlet air density, more mass flow rate is achieved. The power produced by the turbine is nearly a linear function of air mass flow rate.

It is therefore conceivable that increased mass flow can be achieved by increasing the air density. If the additional mass flow from the fuel is ignored, then the ideal gas equation in respect to mass flow rate is:

$$m = P1V1/RT1$$

This equation suggests that the power output is a linear function of air density and linear inverse function of temperature.

Various attempts have been made to resolve the problems encountered in enhancement of process air inlet mass. Some of the patents are listed below:

PRIOR ART

US Patent application Publication No. 2006/0225696 discloses a mechanism configured to receive air which has been sucked through a device that imparts turbulence to the air and structured to establish regions of enhanced density at locations down stream of the mechanism. This invention attempts to increase availability of oxygen for combustion by imparting low-amplitude, high-frequency turbulence and angular velocity to the moving air. Extend of air mass enhancement obtained will be very low and this device will be of very little use in tropical and arid regions due high prevalent temperatures.

U.S. Pat. No. 727,386 discloses a process for controlling the cooling air mass flow of a gas turbine set. This invention uses compressors and inter-stage cooling devices to control the amount of cooling air circulated in a gas turbine set. There is no attempt made in this invention to enhance the air mass of process air required for combustion.

U.S. Pat. No. 6,935,251 reveals a steam generating combustion system and method for emission control using oxygen enhancement. This invention relies on an oxygen enriched gas generation system to improve the percentage of oxygen in the combustion air steam to control the pollutants present in the flue gas. This type of enriched gas generation system is not suitable for processes were high flow rates are required and capital, running costs of such units will be prohibitively high.

U.S. Pat. No. 5,678,526 discloses a system and diagnostics for providing an internal combustion engine with oxygen enriched air to control emission of pollutants by providing polymeric oxygen enrichment membrane device. This type of membrane enrichment system is not suitable for process were high flow rates are required.

All the above listed patents have inherent limitations and have failed to address the need for a system to improve the available air mass at the inlet point of the consumption point.

OBJECTS OF THE INVENTION

One of the objects of this invention is to provide a system and apparatus for enhancement of inlet air mass that is capable of handling high mass flow rates.

Another object of this invention is to provide a system and apparatus for enhancement of inlet air mass that is capable of operating in tropical weather conditions.

Yet another object of this invention is to provide a system and apparatus for enhancement of inlet air mass that is capable of operating with very low pressure drop across the system.

Another object of this invention is to provide a system and apparatus for enhancement of inlet air mass that is capable of obtaining consistent air temperature irrespective of ambient conditions.

Yet another object of this invention is to provide a system and apparatus for enhancement of inlet air mass that is capable of operating with very low consumption of water.

Another object of this invention is to provide a system and apparatus for enhancement of inlet air mass that is easy to manufacture.

Yet another object of this invention is to provide a system and apparatus for enhancement of inlet air mass that is easy to install.

Another object of this invention is to provide a system and apparatus for enhancement of inlet air mass that is inexpensive to maintain.

Yet another object of this invention is to provide a system and apparatus for enhancement of inlet air mass that is robust in construction.

Another object of this invention is to provide a system and apparatus for enhancement of inlet air mass that is economical in operation.

SUMMARY OF THE INVENTION

This invention relates to a system and apparatus for enhancement of inlet air mass for air consuming processes. This invention envisages a filtration system that causes very low pressure drop across the filtration system coupled with inlet air mass enhancement by cooling.

Any reciprocating or rotary compressor has a fixed volume for intake air. To increase the capacity of the compressor there are only two ways that can be adopted viz. (1) increase the density of the air (2) increase the air pressure at the inlet plenum itself. In this innovation both the above mentioned concepts are used. The inlet air pressure is increased by reducing the inlet air pressure drop by using the new filtration system and the mist eliminator system. Secondly, the inlet air density is increased by reducing the temperature of the air. This reduction of temperature is done by applying vapor absorption technology and using water as the chilling medium as other coolant has negative impact on the metallurgy of the compressor blades. The pivoting point of this invention is the proper synchronization of the vapor absorption technology with inlet air cooling, filtration and mist elimination to automatically adjust itself to the continuous changing environment conditions.

Cooling of inlet air results in power augmentation due to increase in the mass of air flow and it also provides an improvement in efficiency. The efficiency improvement comes with the lowering of the $T_{min}$ temperature in the Carnot efficiency equation. The power boost achieved at a typically hot and dry region can be as much as 15%.

The amount of work the compressor consumes depends on ambient conditions such as air pressure, temperature and humidity.

Gas turbines operate at a constant volume of air,
Power generated depends upon the mass flow of air.
Warm air is less dense than cold air
Higher inlet air temperature results in lower power output.
In addition, warm air is much harder to compress than cold air, leaving less net available shaft energy.

Following methods may be used for cooling process in let air:
1. Evaporative Cooling:
   Water flows over a corrugated surface and evaporates thereby cooling the air. Advantages of this type of evaporative cooling are:
   (i) The equipment and installation cost are not very high.
   (ii) Parasitic load of the cooling water is relatively small.
   (iii) Works best in hot climatic conditions.
   Limitations are:
   (i) Limited possibility to reach wet-bulb temperature.
   (ii) High pressure drop loss due to impediment in free flow of air.
   (iii) Limited to ambient conditions.
   (iv) Water-quality dependent.
   (v) Size restricted by media velocity.
2. Fogging:
   Water in the form of a fine spray, introduced upstream of the compressor evaporates to cool the inlet air.
   Advantages of Fogging are:
   (i) Cause low pressure drop.
   (ii) Minimal parasitic load.
   (iii) Low installation cost.
   Limitations are:
   (i) Can not go below Wet Bulb Temperature.
   (ii) Limited by ambient conditions.
   (iii) Need to use de-mineralized water.
   (iv) There are chances of Trace elements entering Compressor.
   (v) Downstream material may have to be upgraded to non corrosive materials.
   (vi) Not suitable for use in humid environment
3. Refrigeration Cooling:
   A stand-alone refrigeration unit cools the inlet air achieving temperatures well below dew point.
   Advantages are:
   (i) Consistent leading air temperature irrespective of ambient conditions.
   (ii) Advantageous when water is scarce
   (iii) Independent of Water Quality
   (iv) No Risk of erosion damage.
   Limitations are:
   (i) Higher parasitic load compared to Fogging Systems
   (ii) Higher installed cost than others.
   (iii) Large footprint compared to others
   Cooling air to temperature below wet bulb temperature is possible only in refrigeration cooling system.

Wet bulb temperature is the temperature indicated by a moistened thermometer bulb exposed to the air flow. Wet Bulb temperature can be measured by using a thermometer with the bulb wrapped in wet muslin.

Cooling of inlet air by water injection method has been attempted. For instance, U.S. Pat. No. 5,537,813 discloses a gas turbine inlet air combined pressure boost and cooling method and apparatus. The inlet air is treated in a vertical tower by admitting inlet air and cooling water at the top end of the tower. The cooling water is injected into the tower at a velocity greater than that of the inlet air. This increases the air pressure due to the difference in the relative velocities of the inlet air and the cooling water. In this system large quantities of cold water would be required to be stored and pumped up to the top of the tower repeatedly to provide a continuous air stream at a suitable temperature. Capital and running costs are very high. Humidity of the treated air will be very high and may require further conditioning. Therefore this device is not practical, efficient and robust in construction.

Therefore there is a need for a practical, compact system and apparatus for effecting air mass enhancement.

According to this invention there is provided a system and apparatus for enhancement of inlet air mass for processes comprising:
a conduit for introducing air having an air inlet and an air outlet; said conduit defining an internal air path between said inlet and outlet; and having along said path a coarse filtration station adapted predominantly to entrap particulate matter of size greater than about 15 microns; a heat exchanger type chilling station adapted to reduce the temperature of passing air from atmospheric temperature to about 15 degrees Celsius; a combined mist eliminating, medium filtration station adapted to separate all the water droplets in the passing air and adapted predominantly to entrap particulate matter of size up to about 10 microns; and a fine filtration station adapted predominantly to entrap particulate matter of size greater than about 2 microns.

Typically the conduit is an elongate duct preferably rectangular cross section.

Typically the filtration station consists of framework air-tightly secured to the inner walls of said duct and filter media air-tightly secured to said framework.

Preferably the mist eliminating station is provided with means to collect and drain moisture removed from passing air.

Typically the mist eliminating station and medium filtration stations are combined into one unit.

The filtration media may be made from a material selected from a group of materials consisting of natural fiber, synthetic fiber, paper, wire mesh, fabric, and ceramic.

In accordance with a preferred embodiment of this invention the filter media consists of layers arranged relatively coarse to fine in structure across said path at each of said filtration station in an operative direction from the inlet to the outlet.

Typically the filter media has a tubular profile and is provided with internal pockets.

Typically the chilling tubes are provided with external fins.

Typically the fins are provided with aerodynamic profiles adapted to create low impediment to fluid flow.

Typically the chilling tubes are made from material selected from a group of materials consisting of copper, aluminum, alloys of copper, alloys of aluminum and stainless steel.

Typically the fins provided on chilling tubes are made from material selected from a group of materials consisting of copper, aluminum, alloys of copper, alloys of aluminum and stainless steel.

Typically the chilling tubes are coated with composite coatings adapted to improve heat transfer and reduce corrosion.

BRIEF DESCRIPTION OF THE ACCOMPANYING DRAWINGS

The system and apparatus for enhancement of inlet air mass for air consuming processes in accordance with this invention will now be described with reference to the accompanying drawing, in which.

Figure 1:
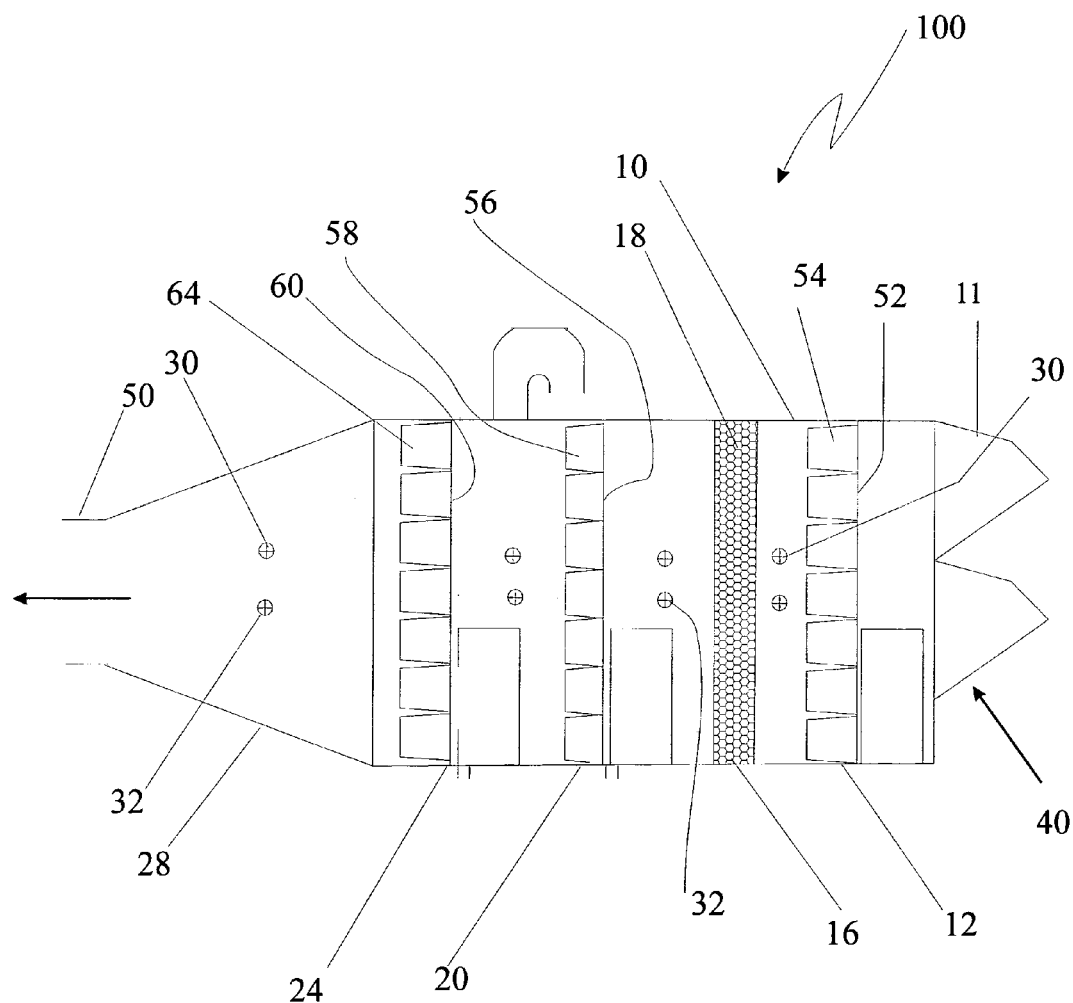
FIG. 1 is the sectional elevation of the inlet air mass enhancement apparatus in accordance with this invention.
Figure 3:
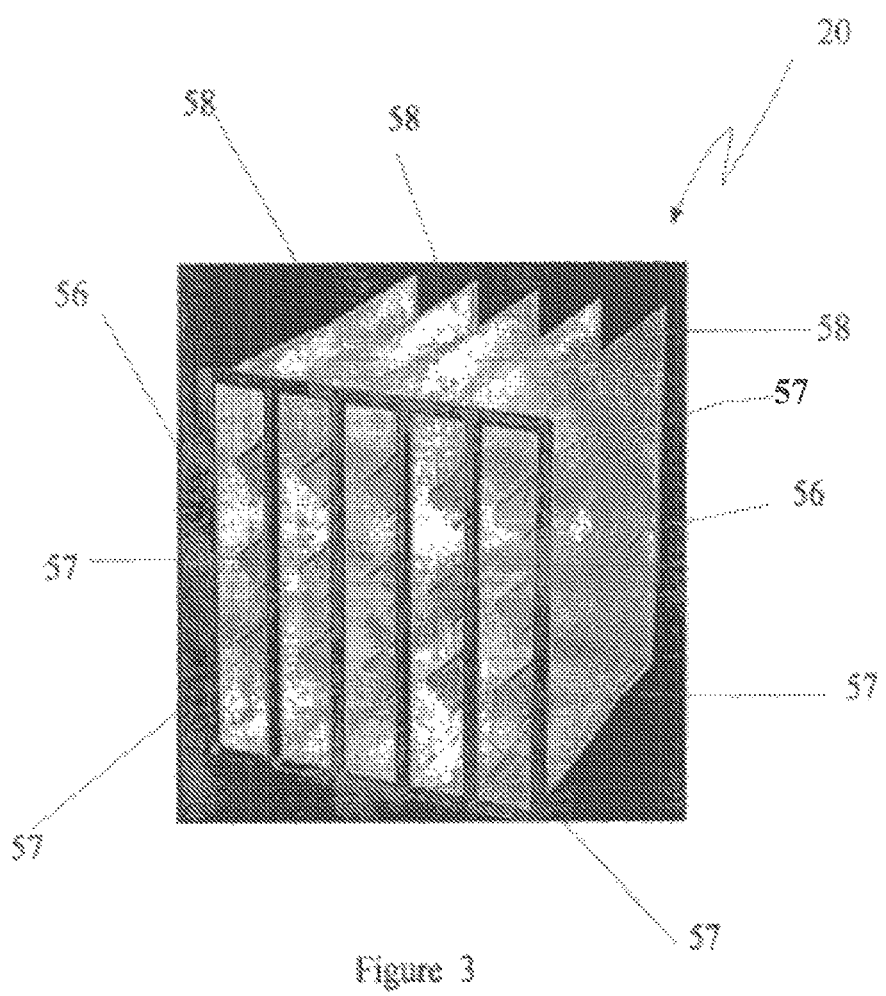
Figure 4:
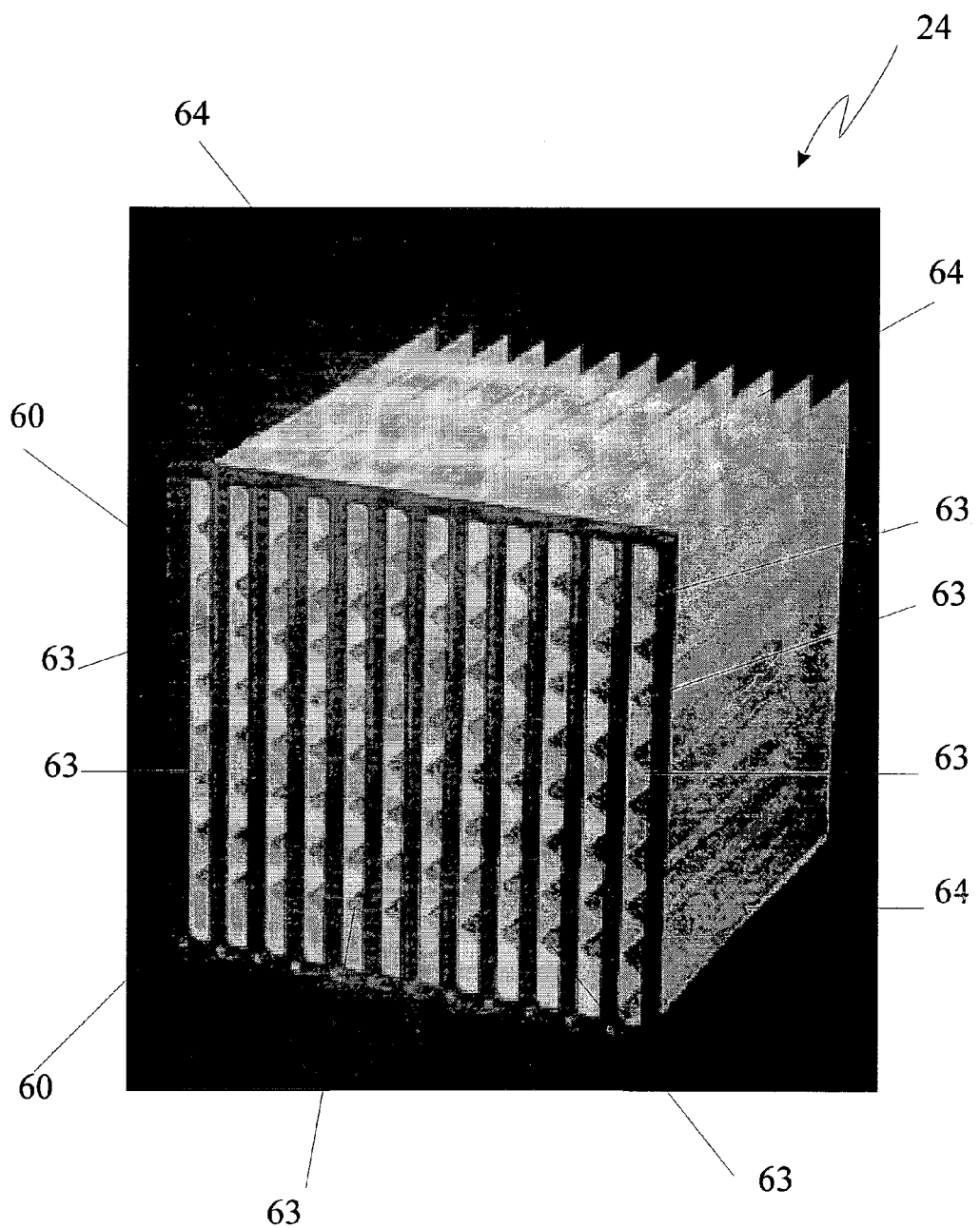

FIG. 3 is perspective view of the filtration station with Vee shaped filter provided with internal pockets made of progressive media used for mist eliminating and medium range filtration of the inlet air mass enhancement apparatus of FIG. 1; and FIG. 4 is perspective view of the filtration station with Vee shaped filter provided with internal pockets made of progressive media used for fine range filtration of the inlet air mass enhancement apparatus of FIG. 1.

DETAILED DESCRIPTION OF ACCOMPANYING DRAWINGS

Referring to FIG. 1 the system and apparatus for enhancement of inlet air mass for air consuming processes is indicated generally by reference numeral (100).

The device (100) is furnished with a conduit (10), a weather hood (11) provided at the air entry side of the conduit (10), and a coarse filtration station (12), consisting of framework (52) air-tightly secured to the inner walls of the conduit (10) and filter media (54) air-tightly secured to the frame work (56).

The conduit (10) is also provided with a heat exchanger type chilling station (16). The chilling station (16) is typically positioned in the conduit (10) having side walls and finned chilling tubes (18). These chilling tubes (18) and fins are made of materials having high thermal conductivity to ensure high rate of heat transfer and are coated with coating composites to improve heat transfer and control corrosion. Chilling fluid is circulated through the tubes and the pre filtered air passing through the conduit is cooled to the designated operating temperature of the system. The operating chilling station temperature can be as low as 4° C.

The conduit (10) is also provided with a mist eliminator and a medium filtration station (20), consisting of framework (56) air-tightly secured to the inner walls of the conduit (10) and filter media (58) air-tightly secured to the frame work (52).

The conduit (10) is also provided with a fine filtration station (24), consisting of framework (60) air-tightly secured to the inner walls of the conduit (10) and filter media (64) air-tightly secured to the frame work (60).

Expansions duct (28) provided at the exit end of the conduit (10) conveys the processed air to the consumption point. Pressure (30) and temperature (32) recorders are provided between the coarse filtration station (14) and the chilling station (18); between the filtration stations and also at the exit point in the expansion duct (28).

Process air introduced at the inlet end (40) of the conduit (10) passes through the coarse filtration station (12), chilling coils (18), mist eliminator and medium filtration station (20), fine filtration station (24) and the expansion duct (28). The process air finally passes through the exit end (50) of the conduit (10).

Figure 2:
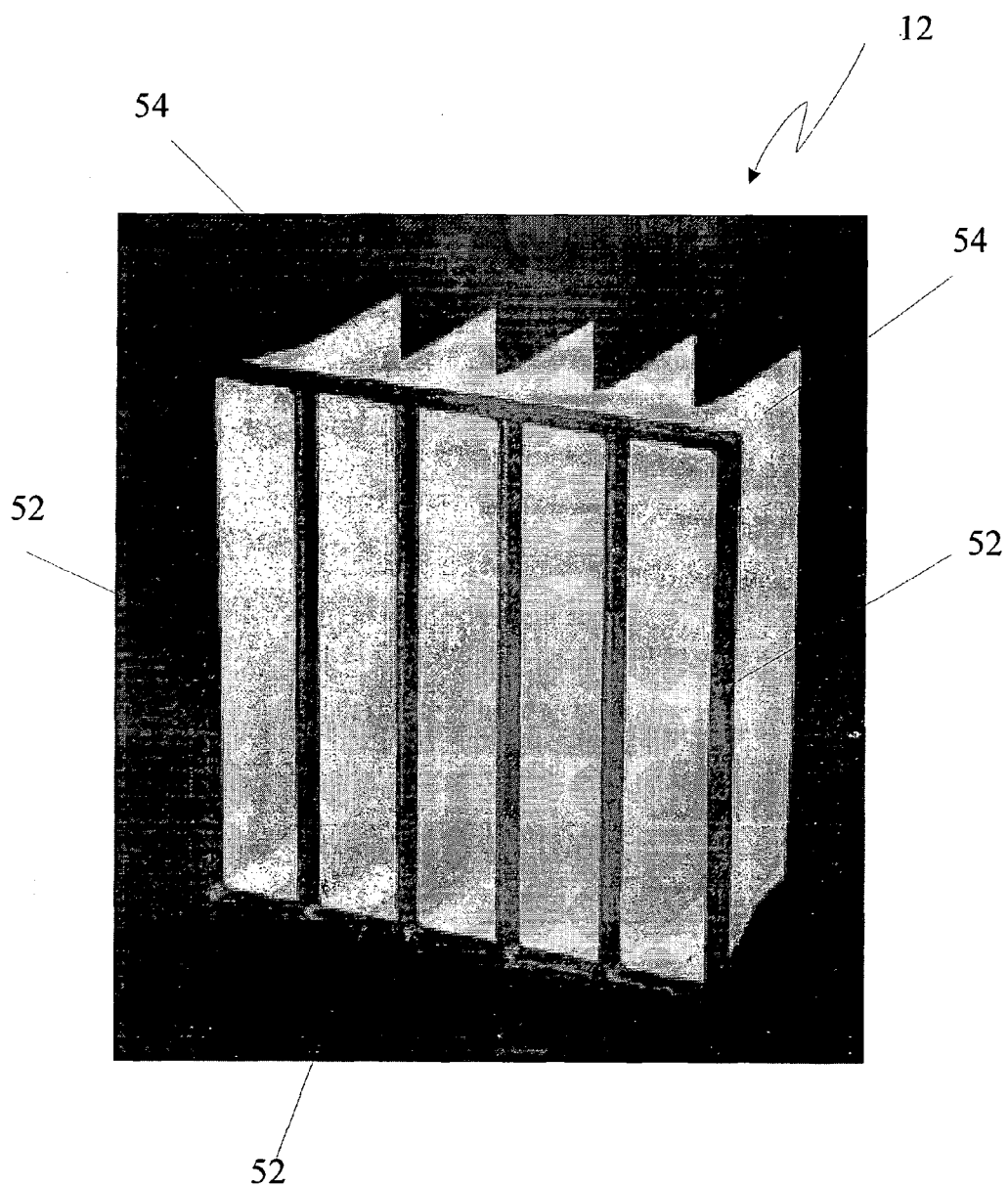
FIG. 2 is a perspective view of the filtration station with Vee shaped progressive filter media used for coarse filtration of the inlet air mass enhancement apparatus of FIG. 1.

Referring to FIG. 2, the coarse filtration station is indicated generally by the reference numeral (12). The coarse filtration station (12) consists of rigid frame work (52) and Vee shaped progressive filter media (54) of polymeric material of grades ranging from coarse to fine across the thickness of the filter media. The filter media (54) is air-tightly secured to the frame work (52) so that all the air passing through the filtration station (12) passes through the filter media (54).

Referring to FIG. 3, the mist eliminator and medium filtration station is indicated generally by the reference numeral (20). The mist eliminator (de humidification station) and medium filtration station (20) consists of rigid frame work (56) and Vee shaped progressive filter media (58) of polymeric material of grades ranging from coarse to fine across the thickness of the filter media. The filter media (58) is air-tightly secured to the frame work (56) so that all the air passing through the filtration station (20) passes through the filter media (58). The filter media is formed into a "Vee" shaped elongate tubular member, provided with internal pockets (57). As the air flows through the filtration station (20) these internal pockets (57), allow certain amount of air passage through them and in the process improve the rigidity of the "Vee" shaped tubular filter media offering maximum area of filtration. This reduces the pressure drop across the filtration station.

Referring to FIG. 4, the fine filtration station is indicated generally by the reference numeral (24). The fine filtration station (24) consists of rigid frame work (60) and Vee shaped progressive filter media (64) of polymeric material of grades ranging from coarse to fine across the thickness of the filter media. The filter media (64) is air-tightly secured to the frame work (60) so that all the air passing through the filtration station (24) passes through the filter media (64). The filter media is formed into a "Vee" shaped elongate tubular member, provided with internal pockets (63). As the air flows through the filtration station (24) these internal pockets (63), allow certain amount of air passage through them and in the process improve the rigidity of the "Vee" shaped tubular filter media offering maximum area of filtration. This reduces the pressure drop across the filtration station.

This invention enhances the air mass available at the consumption point of air consuming processes by:
1. Improving the flow characteristics of air in the ducting by reducing turbulence and stagnant air pockets.
2. Reducing pressure drop due to filtration by using improved filter media and method of filtration.
3. Cooling the process air to temperature below ambient temperature by vapour absorption refrigeration method to improve density and there by enhance the air mass.

Air required for any air consuming process is drawn from the atmosphere by sucking in air in to a conveying duct through an inlet opening provided with wire netting and some basic filtration arrangement, to keep out large floating matter like pieces of paper and small birds and the like.

The consumption point of air is invariably located away from the inlet opening and the ducts have to be provided with bends and change in elevation depending on the end process, safety aspects and specific location of the unit. As the air flows through the conveying ducts the air encounters resistance. Also the bends and changes in the elevation create turbulence and stagnant air pockets. This leads to drop in the air pressure. The difference in the air pressure at the inlet (atmospheric pressure) and the pressure at the consumption point is known as pressure drop (delta P) of the conveying system. Pressure drop also occurs due to other impediments to air flow like introduction of filters, and measuring instruments in the path of air flow. Reduction of pressure drop ensures better availability of air mass at consumption point.

This invention uses filter stations spaced apart from each other depending on required flow rate to reduce pressure drop across the filtration stations. Instead of using a single station of fine rated filter elements, multistage filter stations of progressively finer rating are used to reduce the pressure drop across the system. Multi station filtration method of this invention permits increase in filtration area in a compact construction and effectively increases the particulate matter retention capacity of the unit there by reducing the pressure drop across the filter stations. This invention uses filter media, in each of the filtration stations, that has progressively finer media structure across the media thickness. The larger size particles are trapped at the upstream, coarser outer surface of the media, where as the slightly finer particles are allowed to move inwards and are then trapped. The progressive media structure offers less resistance to air flow, reducing pressure drop across the filters.

Comprehensive tests have shown that conventional coarse range filter of uniform media structure induce a pressure drop of approximately 80 Pa for air flow of 68,000 Cum/hr as compared to a pressure drop of approximately 30 Pa for the same flow rate in the case of progressive media structure type coarse range filter, in accordance with this invention. Similarly the medium range filter media of uniform media structure induce a pressure drop of approximately 90-110 Pa for air flow of 68,000 Cu.m/hr as compared to a pressure drop of approximately 40-50 Pa for the same flow rate in the case of progressive media structure type medium range filter, in accordance with this invention.

A heat exchanger type chilling station is provided between the side walls of the conveying duct with tubes containing and circulating chilling fluid. As the air passes over the finned chilling tubes heat exchange takes place and the air temperature drops to the designated temperature of the system. Heat transfer area of the chilling tubes is decided by the designated flow rate and required temperature of the specific application. The positioning of the tubes and the profile of the cooling fins are selected such that there is prolonged contact between the heat transfer surface and passing air and at the same time causing minimum resistance to air flow.

Typical flow rate of 68,000 Cu.m/hr at ambient temperature condition of approximately 28-30° C., can be increased to about 72,000 Cu.m/hr by cooling the air to approximately to 15° C.

The progressive multi station filtration system of 68,000 Cu.m/hr rating and the chilling station has a low pressure drop of about 120 Pa across the filtration and cooling stations under as installed condition and expected to raise to about 180 Pa after six months of usage. The total estimated useable life of the filter media is approximately 36 months under normal load conditions.

Tests were carried out to establish mass flow rate through various devices and system of the prior art and according to this invention.

Example 1

Multi Filter Media System with Cooling as Per this Invention, at a Temperature of 28-30° C.

Progressive filter media was assembled in a test rig with coarse, medium and fine filtration station. The test rig was provided with a set of cooling coil of 16 m² face area, manufactured according to this invention between the first and second filter units. The refrigeration unit was switched on and the temperature in the cooling zone was maintained at 28-30° C. Unfiltered atmospheric air was drawn through a centrifugal blower and admitted on the inlet side of the filter bank. Pressures and temperatures on the inlet and outlet side of each of the filters were recorded continuously. Rate of cooling was adjusted to maintain a steady temperature of 28-30° C. in the cooling zone through out the test procedure. The flow rate through the filter was calculated and recorded. Typical flow rate achieved was 68,000 Cu.m/hr and the pressure drop was 40-50 Pa.

Example 2

Multi Filter Media System with Cooling

The above test was repeated after replacing all the filtration media with media of the same rating but the cooling zone was maintained at 15° C. Rate of cooling was adjusted to maintain a steady temperature of 15° C. in the cooling zone through out the test procedure. The flow rate through the filter was calculated and recorded. Typical flow rate achieved was 72,000 Cu.m/hr and the pressure drop was 40-50 Pa.

Tests as above conclusively prove that improved mass flow rate is achieved without any significant increase in pressure drop across the system.

Typically output of air achieved in accordance with this invention is clean, having particles not greater than the desired micron size at temperatures between 4 to 30 degrees Celsius where the delta P [loss in pressure] is low and the mass of air entering the process installation or apparatus is enhanced.

Thus mass of air is enhanced without significantly affecting the other parameters of the air.

While considerable emphasis has been placed herein on the specific structure of the preferred embodiment, it will be appreciated that many alterations can be made and that many modifications can be made in the preferred embodiment without departing from the principles of the invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

The invention claimed is:

1. A system and apparatus for enhancement of inlet air mass for processes comprising:
 a conduit for introducing air having an air inlet and an air outlet; said conduit defining an internal air path between said inlet and outlet; and having along said path a coarse filtration station adapted to entrap particulate matter of a size greater than 10 microns; a heat exchanger type chilling station adapted to reduce the temperature of passing air to 15 degrees Celsius, the heat exchanger type chilling station comprising side walled and finned chilling tubes comprising materials having high thermal conductivity; a combined mist elimination, medium filtration station adapted to separate water droplets in passing air and adapted to entrap particulate matter of a size up to 15 microns; and a fine filtration station adapted to entrap particulate matter of a size greater than 2 microns, wherein said filter media is made from material selected from a group of materials consisting of natural fiber, synthetic fiber, paper, wire mesh, fabric, and ceramic.

2. A system and apparatus for enhancement of inlet air mass for processes as claimed in claim 1, wherein said conduit is an elongate duct preferably rectangular in cross section.

3. A system and apparatus for enhancement of inlet air mass for processes as claimed in claim 1, wherein said filtration station consists of framework air-tightly secured to the inner walls of said duct and filter media air-tightly secured to said framework.

4. A system and apparatus for enhancement of inlet air mass for processes as claimed in claim 1, wherein said mist eliminating station is provided with means to collect and drain moisture removed from passing air.

5. A system and apparatus for enhancement of inlet air mass for processes as claimed in claim 1, wherein said mist eliminating station and medium filtration stations are combined in to one unit.

6. A system and apparatus for enhancement of inlet air mass for processes as claimed in claim 1, wherein said filter media consists of layers arranged in relatively coarse to fine structures across said path at each of said filtration stations in an operative direction from the inlet to the outlet.

7. A system and apparatus for enhancement of inlet air mass for processes as claimed in claim 1, wherein said filter media has a tubular profile.

8. A system and apparatus for enhancement of inlet air mass for processes as claimed in claim 7, wherein said tubular media is provided with internal pockets.

9. A system and apparatus for enhancement of inlet air mass for processes as claimed in claim 1, wherein said chilling station has tubes which are provided with external fins.

10. A system and apparatus for enhancement of inlet air mass for processes as claimed in claim 9, wherein said fins are provided with aerodynamic profiles adapted to create low impediment to fluid flow.

11. A system and apparatus for enhancement of inlet air mass for processes as claimed in claim 9, wherein said chilling tubes are made from material selected from a group of materials consisting of copper, aluminum, alloys of copper, alloys of aluminum and stainless steel.

12. A system and apparatus for enhancement of inlet air mass for processes as claimed in claim 9, wherein said fins provided on chilling tubes are made from material selected from a group of materials consisting of copper, aluminum, alloys of copper, alloys of aluminum and stainless steel.

13. A system and apparatus for enhancement of inlet air mass for processes as claimed in claim 9, wherein said chilling tubes are coated with composite coatings adapted to improve heat transfer and reduce corrosion.

* * * * *

UNITED STATES PATENT AND TRADEMARK OFFICE
CERTIFICATE OF CORRECTION

PATENT NO.       : 8,414,673 B2                                                                 Page 1 of 1
APPLICATION NO.  : 12/519223
DATED            : April 9, 2013
INVENTOR(S)      : Raje et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 929 days.

Signed and Sealed this
First Day of September, 2015

Michelle K. Lee
*Director of the United States Patent and Trademark Office*